PULSE TRAIN SELECTION AND SEPARATION SYSTEM

Filed Dec. 20, 1965 3 Sheets-Sheet 1

INVENTOR
JOEL C. HUNGERFORD
BY Philip D. Amins
ATTORNEY

PULSE TRAIN SELECTION AND SEPARATION SYSTEM

Filed Dec. 20, 1965 3 Sheets-Sheet 2

INVENTOR
JOEL C. HUNGERFORD
BY Philip D. Amins
ATTORNEY

*INVENTOR*
JOEL C. HUNGERFORD

BY Philip D. Amins

*ATTORNEY*

3,484,704
PULSE TRAIN SELECTION AND SEPARATION SYSTEM

Joel C. Hungerford, South Merrimack, N.H., assignor to Sanders Associates, Inc., Washua, N.H., a corporation of Delaware Filed Dec. 20, 1965, Ser. No. 514,991
Int. Cl. H03b *1/04*
U.S. Cl. 328—139 18 Claims

ABSTRACT OF THE DISCLOSURE

The system systematically selects and separates out a series of signals from a continuous, composite train of signals according to the pulse repetition frequency of the desired signal, and according to the relative phase of the desired signal if several signals having the same pulse repetition frequency are present in the composite signal train. The ability to selectively divide the commutating gate into sections in combination with a two-state discriminator circuit, which discriminator circuit controls the inter-pulse width of the clock generator signal, allows the system to separate signals having the same PRF but of differing phase.

The present invention pertains to a PRF sorter, and more particularly to a system for selecting and separating one or more particular pulse trains having a given pulse repetition frequency (PRF) from a composite pulse train having a plurality of pulse trains of different PRF or of the same PRF but which are phase separated from one another.

The prior art PRF sorters use the principle of time correlation between a delayed pulse or gate pulse, caused by a pulse in the train, and the next succeeding pulse in said train. To produce the delayed pulse, some of the aforesaid sorters take the input pulse, process it, and synthesize an output pulse therefrom. Other prior art sorters merely introduce a delay in the pulse train of interest. In the case where the original pulse train is modified, i.e., when an output pulse is synthesized from the input pulse, there is some error introduced by the synthesizing circuitry. The error is a real time delay which causes the loss of pulse position information.

In some applications, such as in radar systems, it is necessary to remove a particular pulse train from a composite pulse train for further processing. This must be accomplished without any change in the original pulse train other than the removal of said particular pulse train. An example of this application would be video processing.

It is therefore an object of the present invention to provide a PRF sorting system which will select and separate a particular pulse train from a composite pulse train without appreciably changing the particular pulse train which is fed into said system and which will not result in the loss of pulse information.

It is another object of the present invention to provide a PRF sorting system which will select and separate a plurality of particular pulse trains from a composite pulse train without causing any distortion of said pulse trains at the outputs of said system.

It is a further object of the present invention to provide a PRF sorting system which will select and separate a particular pulse train from a composite pulse train without introducing any phase deviation or real time delay between the individual pulses of said selected pulse train.

It is yet a more particular object of the present invention to provide a PRF sorting system which will select and separate pulse trains which have the same PRF, but which are out of phase with respect to one another, from composite pulse trains.

It is yet another object of the present invention to provide a PRF sorting system having a plurality of individual stages connected in tandem which will select and separate a plurality of particular pulse trains having the same PRF, but which are out of phase with one another, from a composite pulse train, where the phase sparation between said particular pulse trains is unknown.

It is still another object of the present invention to provide a PRF sorting system which will select and separate a plurality of particular pulse trains having the same PRF and a known phase separation therebetween from a composite pulse train.

The invention, in its broader aspects, comprehends selecting and separating a desired pulse train from a composite pulse train. The apparatus for carrying out the invention includes means for generating a gate pulse train having a PRF substantially equal to the PRF of the desired pulse train. The apparatus of the invention also includes a gate to which the gate pulse train and the composite pulse train are delivered. The nature of the gate is such that, when the gate pulses are coincident with the desired pulses, an output of pulses representing the desired pulse train is achieved. It is also a feature of the apparatus of the invention that there be phase and frequency coincidence between the pulses of the gate pulse train and the pulses of the desired pulse train. This is accomplished by providing means for generating an error signal responsive to phase and frequency deviations between the gate pulses and the desired pulses. The apparatus of the invention further includes means for regulating the gate pulse train generating means in response to the error signals so generated.

These, and other objects, features and advantages of the present invention will become more apparent from the following description of a specific embodiment, when considered in conjunction with the accompanying drawings, wherein:

FIGURE 1 is a block diagram of a preferred embodiment of the pulse selection and separation system of the present invention;

FIGURE 2 schematically illustrates the frequency and phase error sensing circuit depicted in FIGURE 1;

Figure 1:
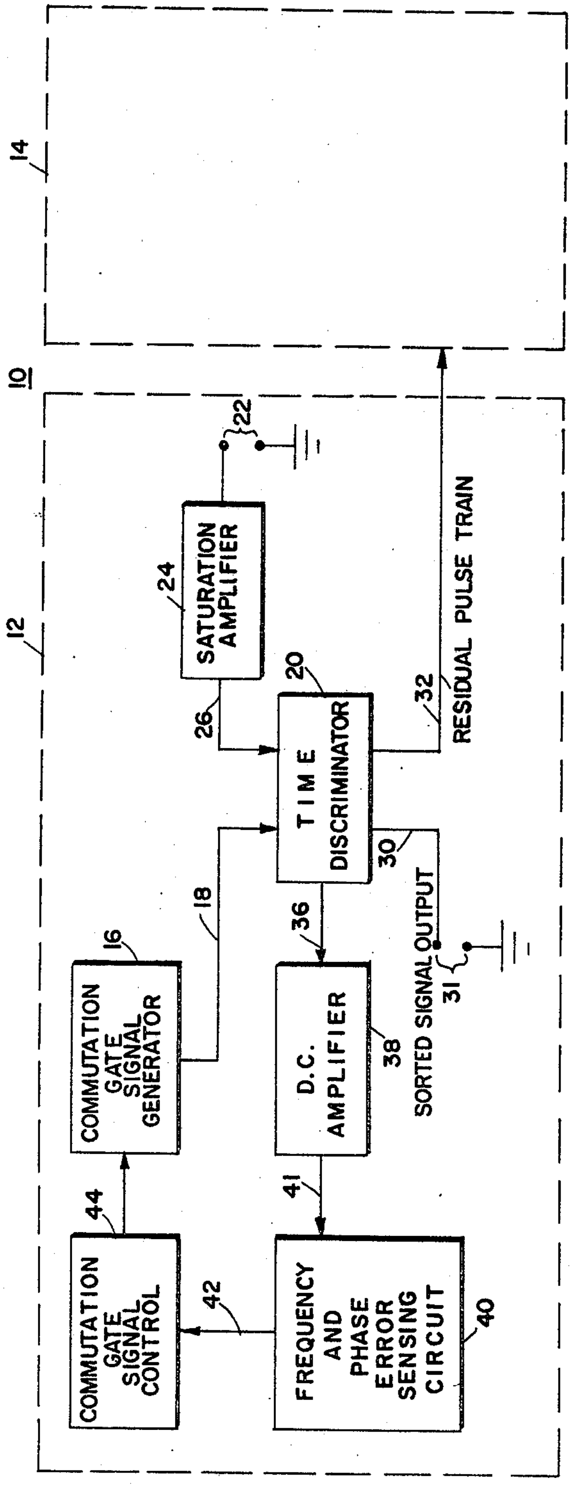

Referring now to the drawings, and more particularly to FIGURE 1 thereof, there is shown a pulse separation and selection system 10, including a first stage 12 and a second stage 14, which are identical to one another and which are connected in tandem.

It is herein to be noted that, although the system is herein illustrated as comprising only two stages, it may include many stages or only one stage, the number of stages required being dependent upon the number of individual pulse trains it is desired to select and separate from said composite pulse train.

The first stage 12 includes a means for generating a series of recurring gate pulses, such as a free-running commutation gate signal generator 16, which has appropriate gates therein and a plurality of outputs. A selected one of the outputs thereof is fed through lead line 18 to a first input of a time discriminator 20. The composite pulse train is applied at input terminals 22 and is fed into a limiting and clipping amplifier, such as saturation amplifier 24. The output of the saturation amplifier is then fed into the second input of the time discriminator 20 via lead 26. Gate pulses 28 (shown in FIGURE 3B) are applied to the input of the discriminator via lead line 18, and have a preset PRF approximately equal to that of the particular pulse train which it is desired to select and separate from said composite pulse train. The gate pulses 28 then acquire the pulses within the selected train, in a well-known manner, and this pulse train is then fed out of the time discriminator via line 30 to output terminals 31. The remainder of said composite pulse train is fed to the second stage 14 via lead line 32, where another particular pulse train may be selected and separated therefrom.

It is herein to be noted that, if there are two or more desired pulse trains having the same PRF but having an unknown or variable phase relationship with respect to one another, then the individual stages, such as 12 and 14, will each select one of said desired pulse trains and separate the same from said composite pulse train. The remainder of said composite pulse train, i.e., the composite pulse with the first desired pulse train removed therefrom, will be fed to the successive stages of the system connected in tandem; and the other desired pulse trains will be selected and separated therefrom.

When the PRF of the selected pulse train differs from that of the gate signal generator, the time discriminator 20 produces an error signal in a manner which is well-known in the art, which is fed via lead line 36 into a D.C. amplifier 38. The amplified error signal is then fed into the frequency and phase error sensing circuit 40 via lead line 41, as will be discussed more fully hereinafter. The frequency and phase errors, or deviations, between the desired pulse train and the gate pulse train are fed via lead line 42 to a commutation gate signal control circuit 44, whose output is fed to the gate signal generator 16. This causes the generator to correct for the frequency and phase deviations between the desired pulse train and the gate pulse train by either increasing or decreasing the PRF of the gate pulses 28, thus providing the desired pulse train at the output terminals 31.

Figure 2:
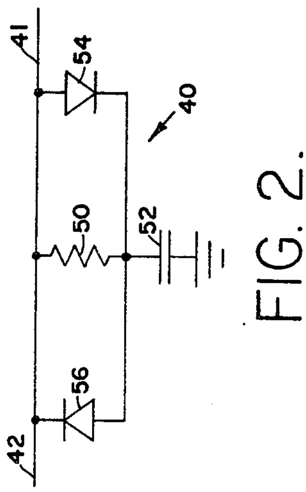

The frequency and phase error sensing circuit 40, illustrated in FIG. 2, includes a resistor 50 which has one terminal thereof connected to the output of the amplifier 38 and the other terminal thereof connected to ground via a capacitor 52, and a pair of oppositely poled diodes 54 and 56 connected in parallel across said resistor.

It will be apparent to those skilled in the art that, although the gate signal generator 16 has herein been described as being of the commutator type, any signal generator which can produce recurring pulse trains can be utilized herein. Also, if desired, the gate signal generator can be provided with control means for varying the width of the gate pulse produced thereby, wherein the width of the gate can be made large prior to the acquisition of the desired pulse train and then decreased after acquisition to provide greater pulse resolution between the desired pulse train and any other pulse train. The control means may be formed as an integral part of the generator system or may be placed external thereof, wherein the period of the gate pulse can be varied manually.

The operation of the system of the present invention, and more particularly, the operation of the first stage 12, will now be described with specific reference to the waveforms shown in FIGURE 3 of the drawings.

Figures 3A, 3B, 3C, 3D:
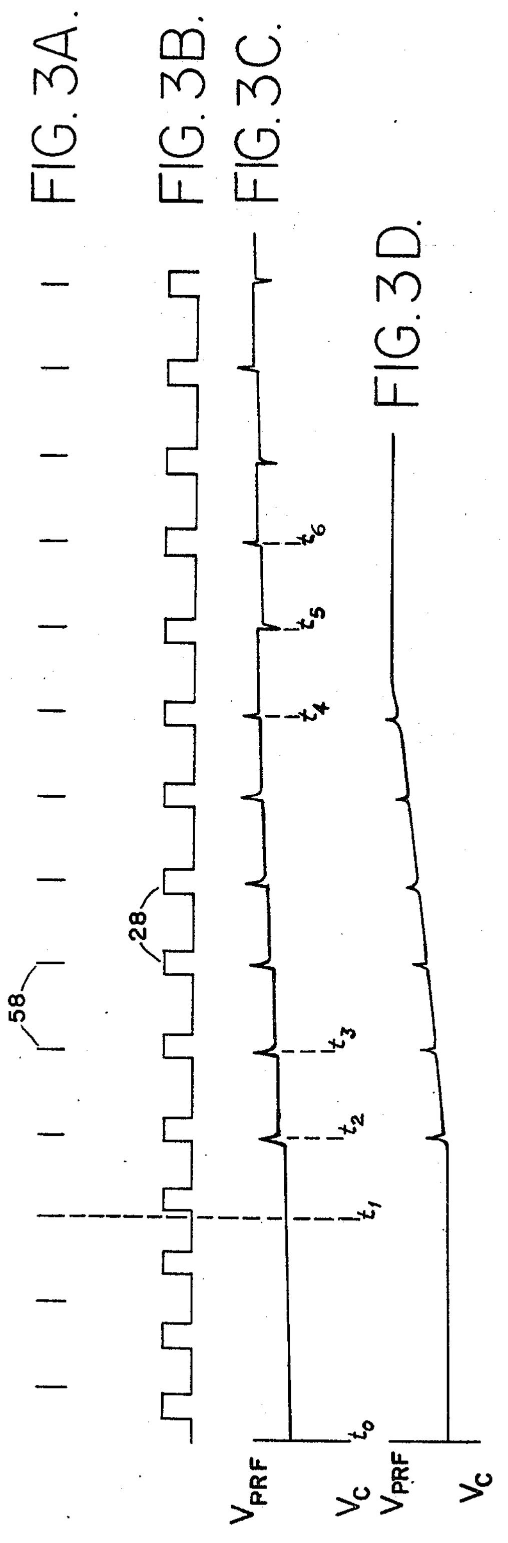
FIGURES 3A through 3D show the pulse waveforms present at various points in the system illustrated in FIGURE 1 and to serve to aid in the explanation of said system.

At the time $t_0$, the commutation gate signal generator 16 is free running, as previously discussed; and the gate pulses 28 (FIGURE 3B) are produced at the output thereof at the preset PRF of said gate signal generator. At time $t_1$, the composite pulse train (not shown) is received at terminal 22, and the pulses 58 of the desired pulse train appear, as shown in FIGURE 3A. As is apparent from the drawings, the PRF of the desired pulse train and the PRF of said gate pulses are different from one another; and no output is presented at the output lead 30 of the time discriminator 20. At this time, the voltage at the output of the sensing circuit 40, i.e., the control voltage V*c*, supplied to the gate signal control circuit 44, appearing on lead line 42, is as shown in FIGURE 3C, and is at a steady state value determined by the amplifier 38. At the time $t_2$, the pulse 58 of the desired pulse train is acquired by the leading portion of the gate pulse 28 and produces an error signal at the output lead 36 of the discriminator 20. This signal is fed to the amplifier 38 and increases V*c* in a positive manner between $t_2$ and $t_3$ and produces a voltage spike at time $t_2$. At a time immediately prior to $t_2$, the voltage on capacitor 52 is V*c*, the resistor 50 being made sufficiently larger so that the time constant of said RC circuit is relatively long, thus preventing any substantial decay of the voltage on said capacitor. The long time constant also prevents the capacitor from charging to the higher value of voltage occasioned by the rise in V*c* at time $t_2$. Thus, the voltage on the capacitor 52 back biases the diode 54, and since the diode has an offset voltage which must be exceeded before conduction thereof begins, the voltage V*c* at time $t_2$ increases very rapidly until the potential across the diode 54 exceeds the offset voltage thereof and drives the diode into conduction. Conduction of the diode 54 defines an alternate conduction path for the charging of the capacitor 52. Since the RC time constant of the circuit through the diode-capacitor series combination is very short, due to the resistance value of the diode in its conductive state, the capacitor then charges very quickly to the new value of V*c*. It is thus seen that a voltage spike is produced at time $t_2$ which readily decreases to the new value of V*c* at the end of the pulse and after the conduction of diode 54 has ceased.

The voltage V*c* at time $t_2$ is fed to the commutation gate signal control circuit 44, which may comprise a unijunction transistor clock generator. V*c*, which is applied to said control circuit 44, causes the same to affect the gate signal generator 16 by causing the inter-pulse period between the last gate pulse and the next succeeding gate pulse to be shortened, thereby effectively placing the pulse 58 at time $t_3$ closer to the center of said gate pulse.

The comparison between preceding and succeeding gate pulses continues from time $t_2$ to $t_4$, at which time the pulse 58 is almost centered in the gate pulse 28. At time $t_5$, the desired pulse appears in the trailing half of the gate pulse; and the time discriminator produces a negative signal which is fed to the sensing circuit 40 and then to the commutation gate signal control circuit 44, causing the inter-pulse period between successive pulses to be lengthened, whereupon at time $t_6$, the desired pulse is again positioned in the leading half of the gate pulse, in immediate proximity to the center thereof. From time $t_6$ onward, the desired pulses are effectively caused to oscillate about the center of said gate pulses by the alternate lengthening and shortening of said gate pulses. It is thus seen that the inter-pulse information supplied to said commutation gate signal control circuit 44 provides the correct phase control to prevent any phase differential between successive pulses of the desired pulse train.

The capacitor 52 stores the pulse-by-pulse phase correction information fed thereto from the discriminator output, and if the pulses appear predominantly in the leading half of the gate pulses, will integrate upwardly and vice versa. Since the voltage on capacitor 52 is normally the voltage corresponding to the free-running frequency of the commutation gate signal generator 16, any change thereacross causes said free-running frequency to change correspondingly, to thereby cause the gate signal frequency to correspond to that of the desired pulse train.

It will therefore be apparent that the pulse-by-pulse information is utilized to provide phase correlation, while the average of said pulses serves to provide frequency correlation.

Figures 4A, 4B:
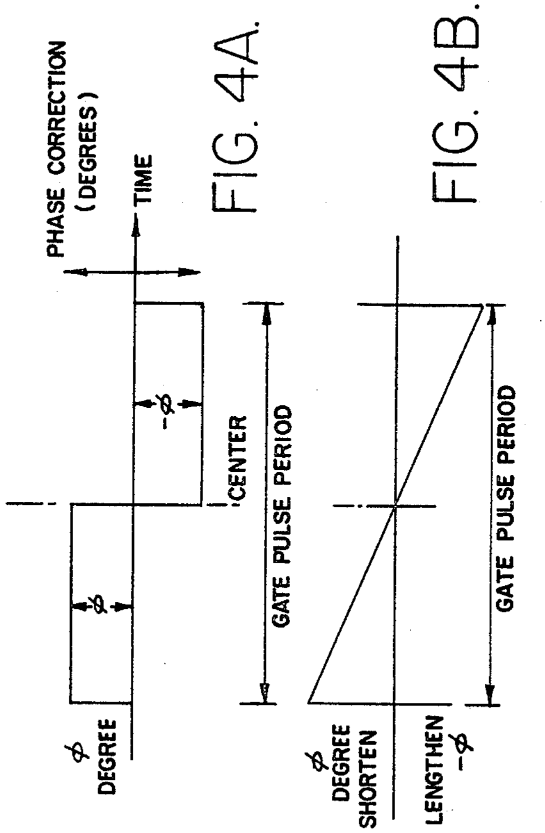
FIGURES 4A and 4B illustrate the response curve of two specific types of time discriminators which may be utilized in the present invention.

The effective oscillation of the desired pulses about the center of the gate pulses is due to the type of time discriminator utilized herein and whose response curve is shown in FIGURE 4A, wherein the voltage output is plotted as a function of time. The voltage peaks of the time discriminator response curve are predetermined and produce a definite phase correction, herein denoted $\phi$, between the desired pulse and center of the gate pulse when there is an error signal presented at the output of the time discriminator. This phase correction is occasioned by the shortening or lengthening of the inter-pulse period between successive gate pulses, the period of the time discriminator curve being equal to that of the gate pulse. As will be apparent from the response curve, any deviation of the desired pulse from the center of the gate pulse will produce an error signal to compensate therefor; thus causing a phase shift between said desired and gate pulses. This compensation will always produce an over-correction, thus creating an effective oscillatory motion of the desired pulses within the gates. It will be appreciated that, in reality, the desired pulse train has a definite PRF and phase with respect to the gate pulse, and that said gate pulses are actually shifted with respect to the next succeeding gate pulses.

The positive phase shift $\phi$ serves to shorten the inter-pulse period between two successive gate pulses, while the negative phase shift $-\phi$ serves to lengthen the inter-pulse period between two successive gate pulses.

The response curve of another type of time discriminator is shown in FIGURE 4B. When a discriminator having this response curve is used, the phase shift $\phi$ produced by an error signal on the output of said discriminator is variable and thus permits the desired pulses to be locked in synchronization with the center of said gate pulses after the same have been positioned thereat in the manner described hereinbefore. The control voltage $V_c$ appearing on lead line 42 when the system employs this type of time discriminator is shown in FIGURE 3D.

As has been hereinbefore discussed, when the composite pulse train contains a plurality of pulse trains having a single PRF but which are out of phase with each other, and the phase separation is either unknown or variable, the same can be selected and separated therefrom by employing a plurality of individual separation and selection stages connected in tandem. However, when the phase separation between a plurality of desired pulse trains having the same PRF is both known and fixed, the same may be selected and separated from the composite pulse train by the utilization of but one of said stages employing a commutation gate signal generator. This will be discussed more fully hereinafter in conjunction with FIGURE 5, wherein a portion of the system shown in FIGURE 1 is illustrated. The rest of the system is the same as that shown in FIGURE 1, and similar parts are denoted by similar reference numerals.

Figure 5:
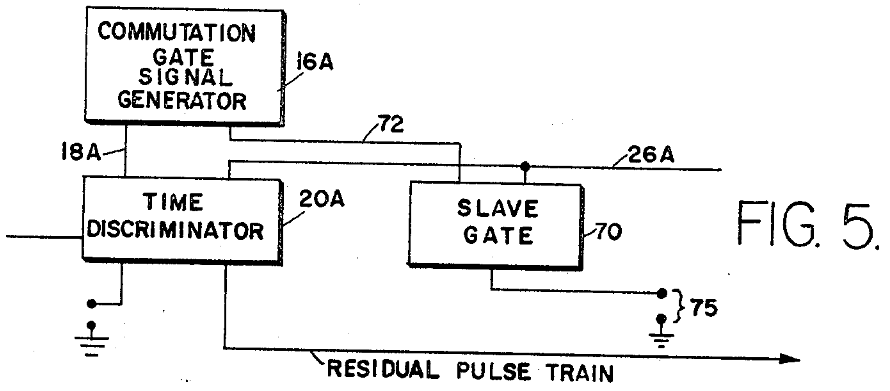
FIGURE 5 is a partial block diagram illustrating a modification of the system depicted in FIGURE 1.

Referring now to FIGURE 5, there is shown a commutation gate signal generator 16A having one of its outputs connected to the time discriminator 20A via lead line 18A. This is precisely the same system as shown in FIGURE 1, and a first desired pulse train would be acquired by the gate pulses produced on the output line 18A within the discriminator 20A, said gate pulses and said desired pulses having the same PRF.

Another output is taken from said signal generator and supplies gate pulses at the same PRF as said first output therefrom but out of phase therewith by a known and predetermined amount. These output pulses are fed to a slave gate 70 via lead line 72, while the composite pulse train is fed thereto by being connected to line 26A.

Thus, after the first desired pulse train has been acquired by the gate pulses supplied to the discriminator 20A via lead line 18A, the second desired pulse train will be acquired by the gate pulses supplied to the slave gate 70. Since the phase separation between said first and second desired pulse trains is known, the second output from the commutation signal generator 16A is taken therefrom at the time which corresponds to the aforementioned phase separation. Thus, the gate pulses supplied to the slave gate will appear simultaneously with the second desired pulse train and will, after acquisition of said first pulse train, as previously discussed, be gated out from the composite pulse train and fed to the output terminals 75.

It is thus seen that, if it is desired to select a plurality of pulse trains having the same PRF and known phase deviations therebetween, the same may be selected and separated therefrom by the utilization of a plurality of slave gates in the manner hereinabove described.

Figure 6:
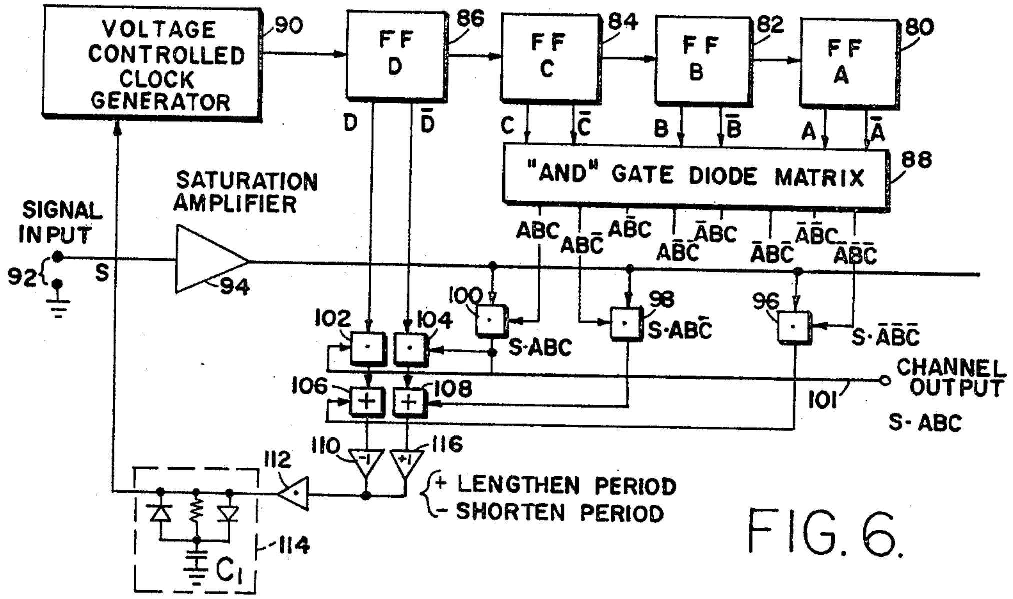
FIGURE 6 is a schematic diagram of a particular embodiment of the system shown in FIGURE 1.

A particular embodiment of the stage 12 of the present invention is shown in FIGURE 6 and includes a plurality of flip-flop circuits 80, 82, 84, and 86, designated A, B, C and D, respectively. The outputs of flip-flops A, B, and C are fed to an "AND" gate diode matrix 88, which is well-known in the art. The flip-flops and said "AND" gate diode matrix form the commutation gate signal generator previously discussed. The outputs of the diode matrix are identified with respect to the flip-flop inputs thereto. The flip-flops are fed by a voltage controlled clock generator 90, which generator determine the frequency of operation of said flip-flops, and thus of the commutation gate signal generator.

Figure 7A:
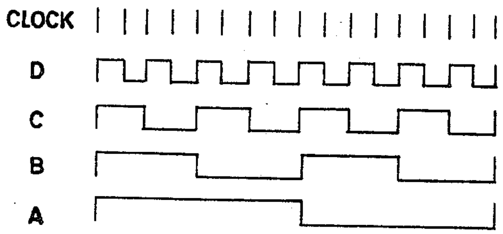
FIGURES 7A and 7B illustrate various waveforms present in the particular embodiment depicted in FIGURE 6.

The output waveforms of the flip-flops are shown in FIGURE 7A, and it will be seen that the period of flip-flop B is one half of that of flip-flop A, while the period of flip-flop C is one half of the period of flip-flop B, and the period of flip-flop D is one half that of flip-flop C.

The composite pulse train is fed into input terminal 92 and passed through a saturation amplifier 94. The amplified train is then fed to a plurality of "AND" gates or coincidence gates 96, 98 and 100, as the first input thereof. The output $\overline{ABC}$ of the diode matrix 88 is fed to the gate 96 as the second input thereof, the output $AB\overline{C}$ of said diode matrix is fed to the gate 98 as the second input thereof, and the output ABC of said diode matrix is fed to the gate 100 as the second input thereof.

The output of gate 100 is fed to "AND" gates 102 and 104 as the first inputs thereof, and the outputs D and $\overline{D}$ of the flip-flop D are fed to said gates 102 and 104, respectively, as the second inputs thereof. The output ABC is utilized as the gate pulse train for acquiring the desired pulse train from the composite pulse train. The gate 100 produces an output, S·ABC when the pulses, designated S, of said desired pulse train have been acquired by the gate pulse ABC, and this output is taken off via lead line 101 as the output of the system.

The gate 102 produces an output, which is fed to an "OR" gate 106 when the first input S·ABC is coincident with the second input D, and the gate 104 produces an output, which is fed to an "OR" gate 108 when the first input *S·ABC* is coincident with the second input $\overline{D}$. It is thus seen that the gate pulse ABC is effectively split into halves ABCD and $ABC\overline{D}$, which correspond to leading and lagging halves, respectively.

If an output pulse, or error signal, is produced by gate 102, and thus gate 106, it signifies that the desired pulse is present in the leading half (ABCD) of the gate pulse. This error signal is then fed through an inverter amplifier 110, a D.C. amplifier 112, an error sensing circuit 114, and thence to the voltage controlled clock generator 90, which produces an early pulse which is fed to the flip-flops 80, 82, 84 and 86. This causes the next succeeding gate pulse ABC to appear early, thus shortening the inter-pulse period between the gate pulse producing said error signal and the next succeeding pulse. This, in turn, causes the desired pulse to be effectively moved toward the center of the gate pulse. This continues until such time as the desired pulses are centrally disposed within the gate pulses, i.e., when the aforesaid pulses are in frequency and phase coincidence, andanerror signal is no longer present.

Alternately, if the desired pulse is present in the lagging half of the gate pulse (ABC$\overline{D}$), an output pulse, or error signal, is produced by the gate 104, and thus gate 108. This error signal is then fed through an amplifier 116, which does not change the sign of the error signal, the D.C. amplifier 112, the error sensing circuit 114, and thence to the voltage controlled clock generator 90, which produces a late pulse which is fed to the flip-flops 80, 82, 84 and 86. This causes the next gate pulse to appear later, thus lengthening the inter-pulse period between the gate pulse producing said error signal and the next succeeding gate pulse. This causes the desired pulse to be effectively moved toward the center of the gate pulse. This continues until there is no longer any error signal presented at the output of the gates 104 and 108, at which time the desired pulses and the gate pulses are in frequency and phase coincidence.

Figure 7B:
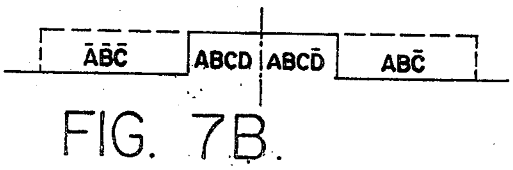

Referring now to FIGURE 7B, it is seen that the pulses $\overline{ABC}$ and $AB\overline{C}$ are disposed immediately before and immediately after the pulses ABC, respectively. Therefore, when a desired pulse is present within the pulse $\overline{ABC}$, the gate 96 produces an output which is fed directly to the "OR" gate 106. This output pulse then causes the next gate pulse to be produced early, in the manner hereinfore described, and permits the system to achieve frequency and phase coincidence more rapidly than if the system would have to wait until one of the desired pulses "walked through" one of the gate pulses ABC. Similarly, when a desired pulse is present within the pulse $AB\overline{C}$, the output of gate 98 is fed to gate 108, and causes the next succeeding gate pulse to be produced later, thus hastening the sought frequency and phase coincidence between the desired pulses and the gate pulses.

It will be apparent that the use of the pulses $AB\overline{C}$ and $\overline{ABC}$ in conjunction with the associated gates, previously discussed, decreases the acquisition time of said desired pulses by the gate pulses ABC.

It is thus seen that I have provided a new and novel pulse selection and separation system which is capable of selecting a particular pulse train having a given PRF from a composite pulse train having a plurality of individual pulse trains of the same or different PRF.

While I have shown and described the preferred embodiments of my invention, it will be apparent to those skilled in the art that there are many modifications, changes and improvements which may be made therein without departing from the spirit and scope thereof, as set forth in the appended claims.

What is claimed is:

1. A system for selecting and separating a desired pulse train having a given PRF from a compositie pulse train having a plurality of individual pulse trains, comprising means for producing gate pulses, a time discriminator means adapted to receive said gate pulses and said composite pulse train and effective to produce said desired pulse train as an output therefrom when the pulses of the desired pulse train are acquired by said gate pulses, said time discriminator means including means for generating an error signal for phase and frequency deviations between said desired pulse train and said gte pulses, and menas responsive thereto for effecting frequency and phase coincidence between said gate pulses and the pulses of the desired incoming pulse train.

2. A pulse train selection and separation system in accordance with claim 1, wherein said means for effecting frequency and phase coincidence between said gate pulses and the pulses of the desired incoming pulse train includes an error sensing circuit which causes the gate pulse producing means to vary the inter-pulse period between successive gate pulses.

3. A pulse train selection and separation system in accordance with claim 1, wherein said means for producing gate pulses comprises a free-running gate signal generator, and said means for obtaining said desired pulse train as an output therefrom comprises a time discriminator circuit.

4. A pulse train selection and separation system in accordance with claim 3, wherein said means for effecting frequency and phase coincidence between said gate pulses and the pulses of the desired incoming pulse train comprises an error-sensing circuit interconnected between the time discriminator circuit and said free-running gate signal generator.

5. A pulse train selection and separation system in accordance with claim 4, wherein a gate signal control circuit is interconnected between the error-sensing circuit and said gate signal control generator, said time discriminator producing a phase error signal when said desired incoming pulses have been acquired by said gate pulses and are not centered therewithin and thus not in phase coincidence therewith, said error-sensing circuit sensing said phase error signal and feeding the same to said gate signal control circuit which in turn causes the gate signal generator to vary the inter-pulse period between each of the gate pulses and the next succeeding gate pulse to cause said desired incoming pulses to be effectively centered within said gate pulses, thus causing said desired incoming pulses to be in substantial phase coincidence with said gate pulses.

6. A pulse train selection and separation system in accordance with claim 5, wherein said error-sensing circuit comprises a series connected resistance-capacitance network having a pair of oppositely pole diodes connected in parallel across said resistor.

7. A pulse train selection and separation system in accordance with claim 6, wherein the means for varying the PRF of said gate signal generator comprises said resistance-capacitance network which integrates the interpulse phase errors, thereby sensing the frequency error between said desired incoming pulses and said gate pulses, said sensed frequency error being fed to said gate signal control circuit and thence to said gate signal generator, causing the same to vary its PRF to provide frequency coincidence between said gate pulses and said desired incoming pulses.

8. A pulse train selection and separation system in accordance with claim 7, wherein said time discriminator means comprises a two-state discriminator circuit, the error signal produced by said two-state discriminator is of a first polarity when said desired pulses are acquired by said gate pulses and are disposed within the leading half thereof and producing an error signal of an opposite polarity when said desired pulses are acquired by said gate pulses and disposed within the trailing half thereof, said error signal of the first polarity causing the inter-pulse period between successive gate pulses to be shortened, and said error signal of said opposite polarity causing the inter-pulse period between successive gate pulses to be lengthened.

9. A system for selecting and separating a desired pulse train having a given PRF from a composite pulse train having a plurality of individual pulse trains, at least one of which is of the same PRF as said desired pulse train but out of phase therewith, said system comprising a free-running gate signal generator, a time discriminator circuit, and an error-sensing circuit, said time discriminator including first and second input terminals and first and second output terminals, said free-running gate signal generator being connected to said first input terminal of said time discriminator for supplying gate pulses thereto at a PRF which is substantially equal to that of the desired pulse train, said composite pulse train being applied to the second input terminal of said time discriminator circuit, producing an error signal to said first output terminal when said gate pulses and the pulses of said desired pulse train are not in frequency and phase coincidence with each other, said desired pulses and gate pulses being in frequency and phase coincidence when said desired pulses are centered within said gate pulses, said desired pulse train appearing at said second output terminal of said time discriminator circuit when said desired pulses are acquired by said gate pulses and are positioned therewithin, said error signal being fed from said first output terminal to said error sensing circuit for sensing the frequency and phase deviation between said desired pulses and said gate pulses, and means for feeding said sensed error signal to said gate signal generator to cause the PRF thereof to vary, whereby said desired pulses and gate pulses are placed in effective frequency and phase coincidence with each other.

10. A pulse train selection and separation system in accordance with claim 9, wherein said means for feeding said sensed error signal to said gate signal generator comprises a gate signal control circuit interconnected between said error-sensing circuit and said gate signal generator.

11. A pulse train selection and separation system in accordance with claim 10, wherein said error-sensing circuit comprises a series connected resistance-capacitance network having a pair of oppositely poled diodes connected in parallel across said resistor.

12. A pulse train selection and separation system in accordance with claim 11, wherein said composite pulse train being fed to the first input terminal of said time discriminator circuit is passed through a saturation amplifier.

13. A pulse train selection and separation system in accordance with claim 12, wherein said free-running gate signal generator is of the commutator type.

14. A system in accordance with claim 9, wherein said gate signal generator includes means for varying the width of said gate pulses.

15. A system in accordance with claim 9, wherein said gate signal generator includes means for increasing the width of the gate pulses prior to the acquisition of said desired pulses thereby and for decreasing the width of the gate pulses after said gate pulses have acquired said desired pulses.

16. A system for selecting and separating a plurality of desired pulse trains from an incoming composite pulse train having a plurality of individual pulse trains therein, said desired pulse trains having the same PRF and being phase separated from each other, said system comprising a plurality of pulse selection and separation stages connected in tandem, each of said stages comprising means for producing gate pulses, means for selecting one of said desired pulse trains from said composite pulse train and delivering the same as an output therefrom when the pulses of said one of said desired pulse trains are acquired by said gate pulses, means for feeding the remainder of said composite pulse train to the next one of said stages, and means for effecting frequency and phase coincidence between said gate pulses and the pulses of said one of said desired incoming pulse trains.

17. A system for selecting and separating a plurality of desired pulse trains from an incoming composite pulse train having a plurality of individual pulse trains therein, said desired pulse trains having the same PRF and being phase separated from each other, said system comprising a free-running gate signal generator having a plurality of outputs for producing a plurality of gate pulse trains which have the same PRF and which are phase separated from each other, a time discriminator circuit, one of said gate signal generator outputs being connected to said time discriminator circuit as a first input and supplying one of said gate pulse trains thereto, means for supplying said composite pulse train to said time discriminator as a second input thereto, said time discriminator circuit producing an error signal as a first output thereof when the gate pulses of said one of said gate pulse trains and the desired pulses of one of said desired pulse trains are not in frequency and phase coindence with each other, said desired pulses and gate pulses being in frequency and phase coincidence when said desired pulses are centered within said gate pulses, said time discriminator producing said one of said desired pulse trains as a second output thereof when said desired pulses are acquired by said gate pulses and are positioned therewithin, an error-sensing circuit interconnected between said first output of the time discriminator circuit and the free-running gate signal generator, said error-sensing circuit sensing the frequency and phase deviation between said desired pulses and said gate pulses and supplying the same to said gate signal generator to cause the PRF thereof to vary in order to place said desired pulses and gate pulses in effective frequency and phase coincidence with each other, and a plurality of gates, each having said composite pulse train connected thereto as a first input thereof, each one of the remaining output terminals of said gate signal generator being connected to separate ones of said gates as a second input thereto, said gates producing the other ones of said desired pulse trains as outputs thereof when the desired pulses of said one of said desired pulse trains have been acquired by the gate pulses of said one of said gate pulse trains and are in effective frequency and phase coincidence therewith.

18. A system for selecting and separating a desired pulse train having a given PRF and a given phase from a composite pulse train having a plurality of individual pulse trains, at least one of which is the same PRF as said desired pulse train but of different phase therewith, comprising means for producing a first set of gate pulses, means for producing a second set of gate pulses, a time discriminator means adapted to receive said gate pulses, said second set of gate pulses and said composite pulse train, said time discriminator means effective to pass said desired pulse train as an output therefrom when said gate pulse and the pulses of said desired pulse train are in time coincidence, said time discriminator means including means for generating an error signal for frequency deviations between said desired pulse train and said gate pulses, said time discriminator means including means for generating a phase discrimination signal for phase deviations between said desired pulse train and said second set of gate pulses, and means responsive to said error signal and said phase discrimination signal for effecting frequency and phase coincidence between said gate pulses and the pulses of the desired incoming pulse train.

References Cited

UNITED STATES PATENTS

| | | | |
|---|---|---|---|
| 3,333,205 | 7/1967 | Featherston | 328—72 |
| 3,328,705 | 6/1967 | Eubanks | 307—235 |
| 3,308,298 | 3/1967 | Rawls et al. | 307—207 |
| 3,090,017 | 5/1963 | Novic | 328—171 |
| 3,063,017 | 11/1962 | Lehan et al. | 328—55 |

JOHN S. HEYMAN, Primary Examiner

J. D. FREW, Assistant Examiner

U.S. Cl. X.R.

307—233, 235; 328—72, 137, 138, 171; 331—14; 343—7.3